(No Model.) 5 Sheets—Sheet 1.

F. C. ROCKWELL.
BICYCLE.

No. 498,888. Patented June 6, 1893.

Witnesses:
C. E. Rockland
John R. Healy

Inventor
Frederick C. Rockwell,
Harry R. Williams
Atty.

(No Model.) 5 Sheets—Sheet 2.

F. C. ROCKWELL.
BICYCLE.

No. 498,888. Patented June 6, 1893.

Witnesses:
C. E. Buckland
John R. Healy

Inventor:
Frederick C. Rockwell,
Harry R. Williams
Atty.

(No Model.)  F. C. ROCKWELL.  5 Sheets—Sheet 3.
BICYCLE.
No. 498,888.  Patented June 6, 1893.
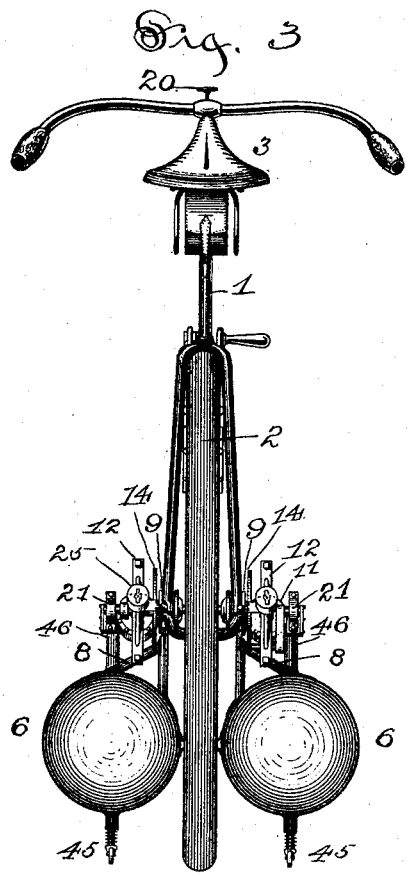

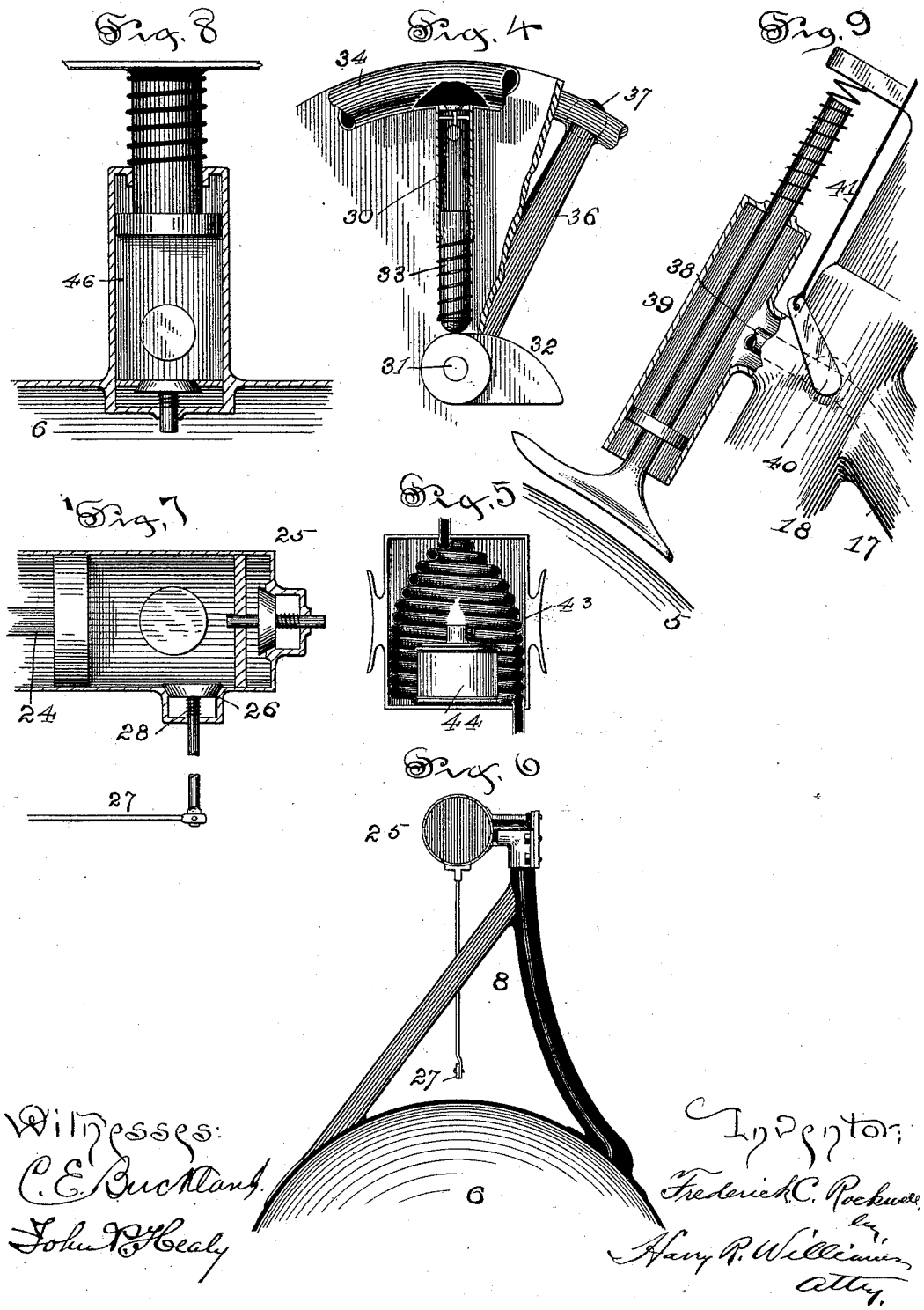

(No Model.) 5 Sheets—Sheet 5.
F. C. ROCKWELL.
BICYCLE.
No. 498,888. Patented June 6, 1893.
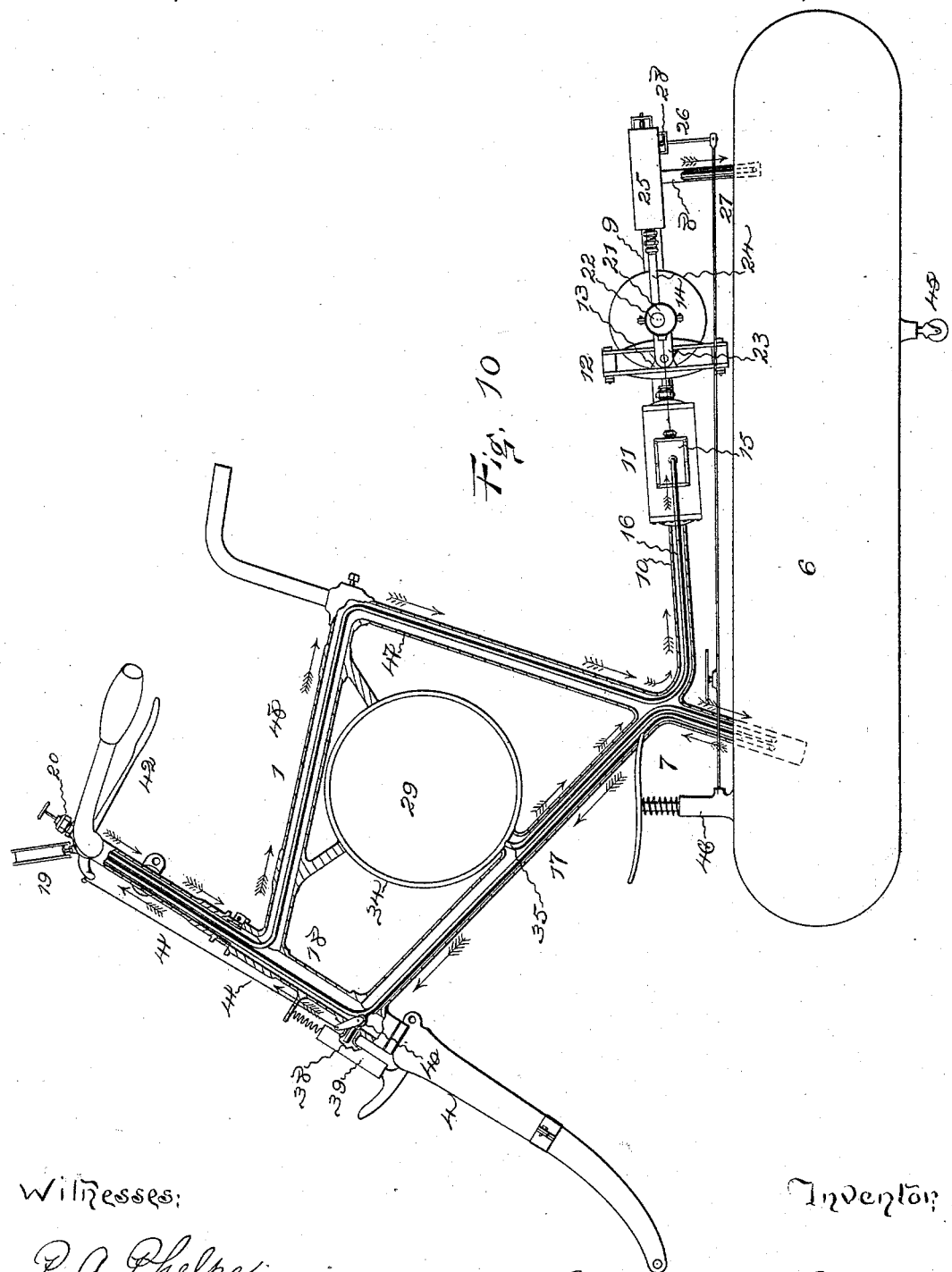
Witnesses:
P. A. Phelps.
C. E. Buckland.
Inventor
Frederick C. Rockwell
by Harry R. Williams
atty
THE NORRIS PETERS CO., PHOTO-LITHO., WASHINGTON, D. C.

UNITED STATES PATENT OFFICE.

FREDERICK C. ROCKWELL, OF HARTFORD, CONNECTICUT.

BICYCLE.

SPECIFICATION forming part of Letters Patent No. 498,888, dated June 6, 1893.

Application filed May 23, 1892. Serial No. 433,962. (No model.)

*To all whom it may concern:*

Be it known that I, FREDERICK C. ROCKWELL, a citizen of the United States, residing at Hartford, in the county of Hartford and State of Connecticut, have invented certain new and useful Improvements in Bicycles, of which the following is a full, clear, and exact specification.

The invention relates to the class of bicycles which are propelled by a motor operated by gas under compression, the object being to provide a two-wheeled vehicle of this class with reservoirs for compressed gas, which may be charged before starting, by hand or foot operating pumps, or which may be kept charged during motion by means of foot pumps, or pumps operated by the momentum of the moving machine. And to this end the invention resides in a vehicle having two wheels supporting a frame which bears motors attached to one wheel, gas reservoirs connected with the motors, hand and foot pumps connected with the reservoirs, power pumps attached to a wheel and connected with the reservoirs, a brake, pressure indicator and valves for controlling the compressed gas, as more particularly hereinafter described and pointed out in the claims.

Referring to the accompanying drawings:—

Figure 1:
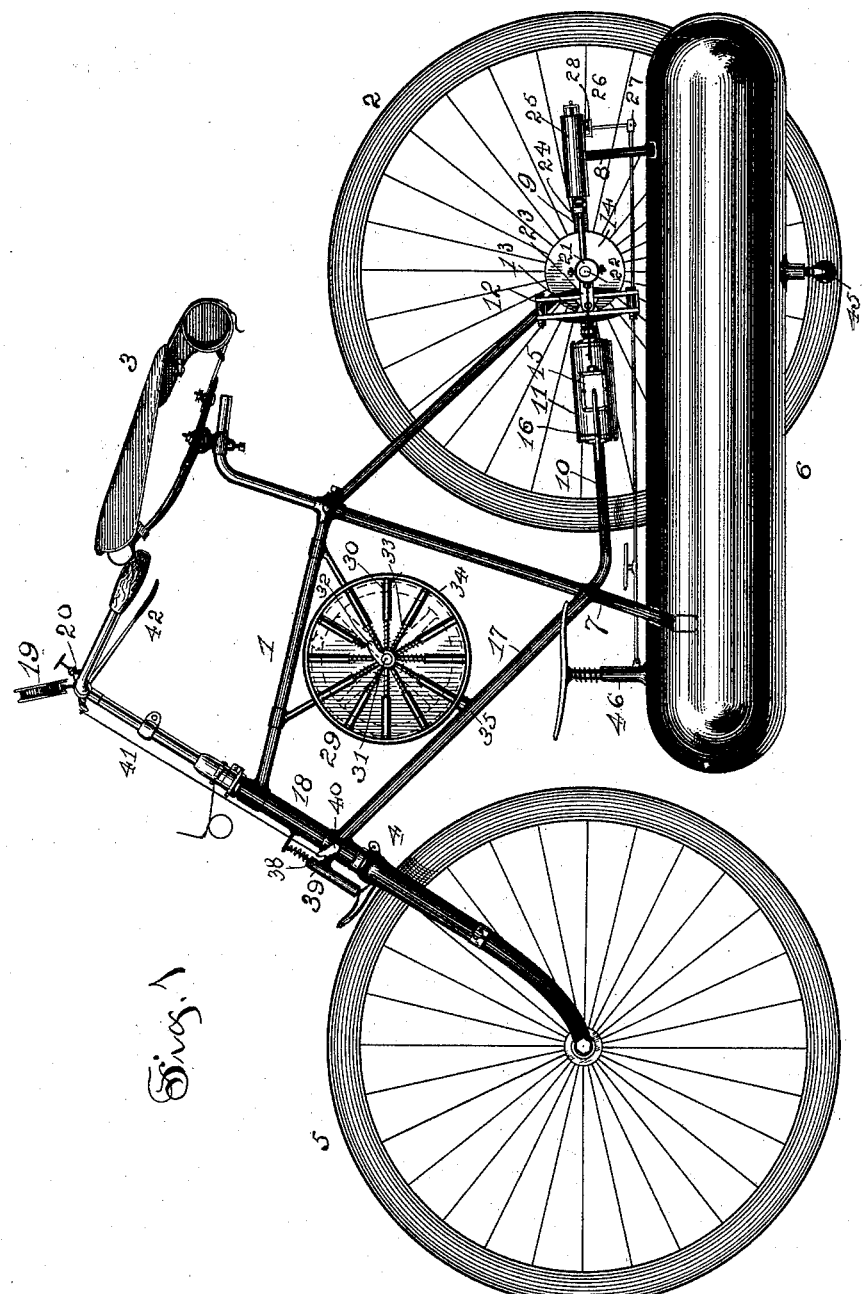
Figure 2:
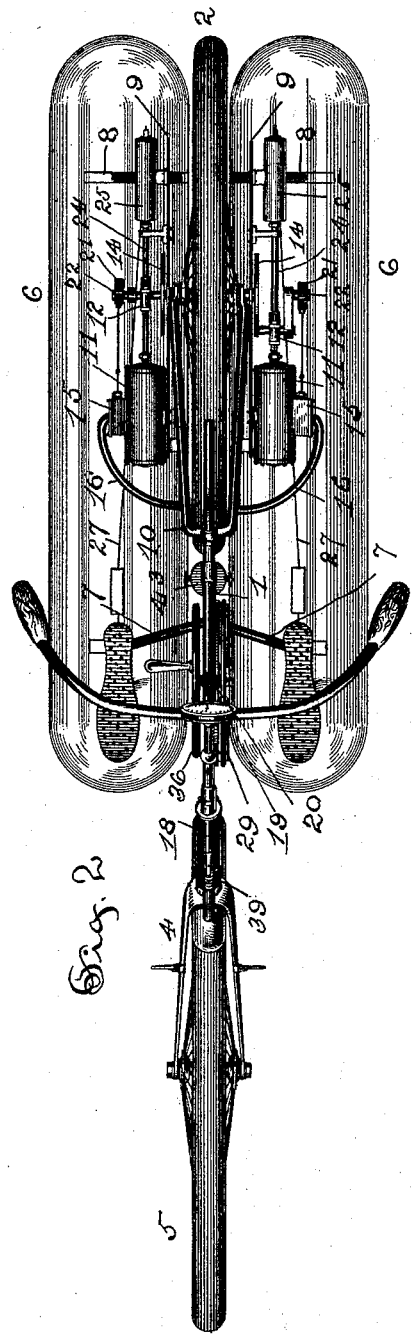

Figure 1 is a side elevation. Fig. 2 is a plan; and Fig. 3 is a rear view, of the machine. Fig. 4 is a detail view of a portion of the hand pump. Fig. 5 is a detail view of an air expanding attachment. Fig. 6 is a detail end view of the power pump. Fig. 7 is a detail enlarged sectional view of the same. Fig. 8 is a detail sectional view of the foot pump; and Fig. 9 is a detail sectional view of the brake. Fig. 10 is an enlarged view showing the frame in section, illustrating the position of the pipes therein.

In the views 1 indicates the frame of the machine, which is of the ordinary tubular construction, rigidly attached to the rear wheel 2 and supporting the seat 3 and the rotary fork 4 which is attached to the front wheel 5. Cylindrical reservoirs 6, formed sufficiently large, of any suitable metal strong enough to stand the desired pressure of the gas for driving the motors are supported upon each side of the rear wheel by means of the braces 7 and 8 attached to the plates 9 which are supported by the axle of the rear wheel and the forked arms 10 of the lower part of the frame. Supported by one end of these plates 9, are the motor cylinders 11, in which move pistons having rods attached to the yokes 12 in which travel blocks 13 pivoted eccentrically to the disks 14 on the axle of the rear wheel. These cylinders 11 are provided with valve chests 15, connected with the reservoirs by the pipes 16, which pass from the valve chest through the hollow forks 10, the hollow arm 47, and the hollow head 18 to a presser gage 19 and throttle valve 20 placed in convenient position to be observed and operated by the rider. These pipes then pass back through the head 18, arm 17, and brace 7, to the reservoirs 6. In these chests 15 are any common form of valves that are connected by rods with the eccentrics 21 on pins 22 projecting from the arms 23 attached to the pivot pins of the sliding blocks 13.

In continuation of the piston rods are rods 24 attached to pumps in the cylinders 25, which are connected with the reservoirs by tubes passing through the braces 8. These pump cylinders are provided with the usual induct and educt valves, also with a valve 26 the stem of which is connected with the lever 27 pivoted to the reservoirs. These valves are normally kept open by the springs 28 so that air is admitted freely through the openings and the pumps normally work freely; but when the levers 27 are depressed, as by the feet of the rider, these valves 26 are closed, and the pump will then force air into the reservoirs. Connected to the forward end of the reservoirs are cylinders 46 having the ordinary induct and educt valves, and a pump provided with pedals and springs so that air may be forced into the cylinders through these pumps, by the feet of the rider, when desired.

Supported by the frame, near the middle, is a pump 29. The form of pump shown consists of a number of pumps 30 of very small capacity, arranged radially about a shaft 31 having a cam 32 in contact with the plungers 33 of the pumps, so that as the cam revolves the pumps are operated successively. The outer end of each of these pumps opens into a circular chamber or tube 34 that has a tube 35 which passes through the hollow arm 17 and brace 7 of the frame to the reservoirs 6. The shaft 31 bears a hand wheel 36 with a handle 37, so that the cam may be revolved to operate the pumps by hand, when it is desired to generate a pressure in the reservoirs. A pipe 38, connecting with the pipe that passes from the tank to the throttle valve and back to the motor, passes into the chamber of the brake cylinder 39. This pipe is provided with a cock 40 which may at any time be opened by the rod 41 and brake handle 42, so that the air under pressure may be admitted to the cylinder to force the brake against the wheel. Between the reservoirs is supported an oven 43 in which a portion of the pipes which pass from the tank to the throttle valve are coiled; and in this oven, beneath the coil, is placed a lamp 44, which may be lighted so as to heat the coil and expand the air to get an additional pressure if desired.

Upon each side of the rear wheel, attached to bosses depending from the reservoirs, are small wheels 45. These wheels do not project downward quite as far as the periphery of the driving wheel, but nearly so, and are provided with springs so as to yield slightly when they strike an unevenness in the surface of the ground.

In use, the reservoirs are filled with air to the desired pressure, by means of either the hand pump 29 or the foot pumps 46, and when the rider mounts the seat and opens the throttle valve, the air passes to the motors and drives the machine. In descending a hill, when there is sufficient momentum to propel the machine by gravity the throttle valve is closed, so that the motors are not worked, and at the same time the rider may, by means of the lever 27, close the valves 26 in the pumps 25, so that the rotation of the wheel will drive the pumps, and pump air into the reservoirs to increase the pressure. This will also act as a brake to prevent the too rapid movement of the machine down the incline. When it is desired to stop suddenly, the brake cock is opened by the brake handle, and the full force of the compressed air is exerted upon the brake plunger to close the brake upon the wheel and stop the machine; and when the rider dismounts, the machine will stand upright, as it does at all times, resting upon the little wheels depending from the reservoirs upon each side of the driving wheel.

Of course, any other gas than air may be utilized under pressure to drive the machine, and as but a small quantity is used to drive the motors, the leading pipes may be quite small, and pass through the tubular portions of the frame, so as to be hidden from view.

I claim as my invention—

1. In a bicycle, in combination, a pair of wheels placed one behind the other, supporting a frame, a pair of reservoirs supported by the frame below the plane of the axles outside of the plane of the tandem wheels, and two motors connected with the reservoirs and attached to the rear axle one on each side of the rear wheel, substantially as specified.

2. In a bicycle, in combination, a pair of wheels placed one behind the other, supporting a frame, a pair of reservoirs supported by the frame one upon each side of the rear wheel, a hand operated pump supported by the frame in line with the wheels connected by pipes passing through the frame with the reservoirs for forcing air thereinto, and motors connected with the reservoirs and attached to the rear axle on each side of the rear wheel, substantially as specified.

3. In a bicycle, in combination, a pair of wheels placed one behind the other, supporting a frame, a pair of reservoirs supported by the frame one on each side of the rear wheel below the plane of the axle, foot operated pumps mounted upon the reservoirs for forcing air thereinto and motors connected with the reservoirs and attached to the rear axle on each side of the rear wheel, substantially as specified.

4. In a bicycle, in combination, a pair of wheels placed one behind the other, supporting a tubular frame, a pair of reservoirs supported by the frame one on each side of the rear wheel below the plane of the axle, a pump connected with the reservoirs by pipes passing through the tubular frame, a pipe that passes through the tubular frame from the reservoir to the handle bar, a throttle valve at the handle bar, a pipe that passes from the throttle to the motors, and motors attached to the rear axle on each side of the rear wheel, substantially as specified.

5. In a bicycle, in combination, a pair of wheels supporting a frame, a pair of reservoirs supported by the frame upon each side of the rear wheel, a brake supported by the frame adjacent to the rim of one wheel and bearing a piston, and a connection for admitting air from the reservoirs to the piston to set the brake, substantially as specified.

6. In a bicycle, in combination, a pair of wheels placed one behind the other supporting a tubular frame, a pair of reservoirs supported by the frame one upon each side of the rear wheel below the plane of the axle, a pump connected with the reservoirs for forcing air thereinto, motors connected with the reservoirs by pipes passing through the tubular frame and attached to the axle at each side of the rear wheel, and a heating oven supported between the reservoirs provided with a source of heat through which the air pipes pass, between the reservoirs and the motors, substantially as specified.

7. In a bicycle, in combination, a pair of wheels supporting a frame, a pair of reservoirs supported by the frame upon each side of the rear wheel, a pair of wheels depending from the reservoirs, a pump connected with the reservoirs for forcing air thereinto, and motors connected with the reservoirs and attached to the axle of the rear wheel, substantially as specified.

8. In a bicycle, in combination, a pair of wheels supporting a frame, a pair of reservoirs supported by the frame upon each side of the rear wheel, a pump provided with a number of radially arranged pistons connected with the reservoirs for forcing air thereinto, and motors connected with the reservoirs and attached to the axle of the rear wheel, substantially as specified.

9. In a bicycle, in combination, a pair of wheels placed one behind the other, supporting a frame, a pair of reservoirs supported by the frame one upon each side of the rear wheel below the plane of the axle, a pump supported by the frame in line with the tandem wheels, pumps attached to the driving axle on each side of the rear wheel supported by and connected with the reservoirs, and motors attached to the axle of the rear wheel, substantially as specified.

FREDERICK C. ROCKWELL.

Witnesses:
H. R. WILLIAMS,
C. L. TUTTLE.